Patented Nov. 28, 1950

2,532,201

UNITED STATES PATENT OFFICE 2,532,201

PROTECTIVELY COATED ALKALI CONTAINING SOLIDS AND METHOD OF COATING SAME

Owen F. Sprague, Niagara Falls, N. Y., assignor to Mathieson Chemical Corporation, a corporation of Virginia No Drawing. Application August 13, 1946, Serial No. 690,341

8 Claims. (Cl. 117—100)

This invention relates to a process of coating alkali containing solids to prevent their contamination by components of the atmosphere and also relates to the novel products so obtained.

Pure caustic alkalies, as well as mixtures containing substantial amounts of caustic alkalies whether in the form of fused cakes, briquettes, beads, prills or other solid forms, must be protected from the action of components of the atmosphere, particularly moisture, and this is usually effected by storing them in closed containers. Exposed to the atmosphere they absorb moisture and carbon dioxide, sufficient to become coated with a concentrated alkali solution and eventually to lose their physical shape and form first a mushy solid and finally an aqueous solution. These solids covered with a film of such solution are slimy to the touch and are extremely dangerous to handle by hand, partly due to the danger of caustic burns and partly due to loss of grip.

The process of the present invention comprises treatment of such alkali-containing solids with an aldehyde of the type which will undergo the Cannizzaro reaction, preferably an aromatic aldehyde having the CHO group attached directly to an aromatic nucleus, and which contains no hydroxyl or carboxylic group. By such treatment, as subsequently more fully described, a strong adherent, non-hygroscopic protective coating is formed on the surface of the caustic solid which prevents access of the atmosphere to the caustic and thus prevents any physical or chemical change in the caustic solid due to atmospheric contamination. The products of the present invention may be exposed to the air for considerable periods without acquiring any film of caustic solution, the coating thus preventing dissolution of the physical shape. Chemical changes due to the atmosphere are also prevented and the composition can safely be handled.

In carrying out the process of the present invention the aldehyde may be applied to the caustic solids in various ways. If the solid is relatively large, such as a cake or briquette, it may be dipped into the undiluted aldehyde or a solution thereof in an inert solvent. After such treatment the solid is allowed to drain and react for a short period of a few minutes to several hours in a dry atmosphere. Subsequently the briquette may be exposed to the atmosphere without danger of deliquescence or contamination. In treating caustic solids in smaller sizes which present a comparatively large surface of reaction, it is usually desirable to use solutions of the aldehyde in an inert solvent. Direct treatment of prills, for example, with undiluted aldehydes may result in the generation of such large quantities of heat that it is difficult to control the reaction, considerable caustic may be consumed by the reaction and the particles of caustic solid may fuse together or otherwise lose their shape.

For diluting the aldehyde, any solvent may be used which is inert to caustic and to the aldehyde. These solvents should ordinarily have a fairly low boiling point in order that they may readily evaporate from the surface of the solid caustic. Petroleum ether of a low boiling point (35–50° C.) is particularly suitable but higher boiling petroleum ethers may be used. Petroleum ether, benzene and other hydrocarbon solvents are usually preferred. However, any solvent having a suitable boiling point such that it can readily be removed from the surface of the solid after treatment and which is unreactive to caustic and the aldehydes at room temperature, or slightly elevated temperatures can be used. If desired, higher boiling solvents may be used and removed by the application of reduced pressure.

Of the suitable aldehydes I note particularly benzaldehyde since it is perhaps at present the commonest and cheapest and is highly effective. However, other aldehydes of the type which will undergo the Cannizzaro reaction, preferably an aromatic aldehyde, having a CHO group attached directly to the aromatic nucleus and which contains no hydroxyl or carboxylic group may be used. Aldehydes which undergo the Cannizzaro reaction are those which contain no hydrogen atom on the carbon atom which is alpha to the CHO group. Hydrocarbon substituted benzaldehydes, for instance tolualdehydes, iso-propylbenzaldehyde, naphthaldehydes and the like may be used. Chloroaldehydes, for instance ortho- or parachlorobenzaldehyde are suitable. The aldehydes used should as previously noted, contain no substituents reacting with caustic to form water such as phenolic or carboxylic aldehydes.

Various concentrations of the aldehyde may be used with advantage, the optimum concentration depending on the proportion of caustic in the solid to be coated, the size of the solids and the reactivity of the aromatic aldehyde. 50% solutions of benzaldehyde in petroleum ether have been found particularly suitable, although in some cases it may be desirable to use 10% solutions or even more dilute solutions where the caustic solids are of particularly small size and when using an aldehyde of greater activity.

The time of treatment is usually very short, ordinarily being of the order of a few minutes. In many cases much briefer periods of contact of the caustic solid with the aldehyde or its solution will be ample. The time of contact should be limited to prevent any excessive consumption of the caustic or the formation of an undesirably thick coating on the surface. The time of drying will depend on whether or not a solvent was used and the nature of the solvent, but is usually very short. Where a thicker film than is attained by a single treatment is desired, the treatment may be repeated.

For many applications the formation of a distinctive colored coating may be desirable and for this purpose, suitable aldehydes may be selected. For example o-chlorobenzaldehyde will form effective pale yellow-tinted coatings. Where uncolored coatings are preferred, benzaldehyde itself or a hydrocarbon substituted benzaldehyde is effective. Various aldehydes of the type described or mixtures of such aldehydes may be used to produce coatings of distinctive colors.

The present invention and it utility will be further illustrated by the following specific examples of its application.

Example I

Caustic briquettes having a composition of 61.4% NaOH, 5.0% $Na_4P_2O_7$, 5.0% $Na_2SiO_3$ and 28.6% $H_2O$ were dipped in undiluted benzaldehyde, removed immediately and allowed to dry 15 minutes in a desiccator. Briquettes so treated, as well as untreated briquettes, were allowed to stand in the atmosphere. After several hours exposure, the treated briquettes showed no sign of being moist and could be safely picked up with the bare hands. The untreated briquettes in the same time were covered with a slimy solution of caustic.

Example II

Caustic briquettes of the same composition as in Example I were dipped into a 50% solution of benzaldehyde in petroleum ether (boiling range 35–50° F.), immediately removed, drained and allowed to dry for fifteen minutes in a desiccator. On exposing the thus-treated briquettes along with untreated briquettes to the atmosphere for two hours, the treated briquettes suffered no change whereas the untreated briquettes were covered with ¼ to ½″ of a mushy mixture of caustic and solution.

Example III

Alkali briquettes of the same composition as in Example I were dipped in undiluted benzaldehyde, drained and allowed to dry for fifteen minutes in a desiccator. The treated briquette was removed and given a second dip in undiluted benzaldehyde, drained and allowed to dry for fifteen minutes in a desiccator. On exposure to air the twice-dipped were protected for an even longer period than briquettes dipped only once.

Example IV

Caustic briquettes of the same composition as in Example I were dipped in a 50% solution of benzaldehyde in petroleum ether, drained and allowed to dry in a desiccator for fifteen minutes. They were removed, retreated and dried as before. On exposure to air they showed about the same degree of protection as the briquettes treated as in Example III.

Example V

A portion of caustic pellets containing 98% NaOH were dipped in undiluted benzaldehyde and a second portion dipped in a 50% solution of benzaldehyde in petroleum ether. Each portion was drained and dried in a desiccator. On exposure to the atmosphere untreated pellets were mushy in three hours, whereas the pellets treated with either diluted or undiluted benzaldehyde were not. The treated pellets flowed freely after several hours exposure whereas the uncoated pellets caked together.

Example VI

Caustic prills containing 99.12% NaOH were treated with a 10% solution of benzaldehyde in petroleum ether using 200 parts of solution to 50 parts of prills. They were immediately removed and dried for 15 minutes in a desiccator. The same solution was used to treat a second portion of 50 parts of caustic prills and a third portion of 100 parts of prills. The first portion of prills after the treatment contained 96.31% NaOH, the second 97.13% and the third portion 98.05% NaOH. The prills were placed in test tubes and exposed to the atmosphere. After 6 hours untreated prills stuck to the sides of the tube when inverted and after 48 hours none would pour from the tube. On the other hand the treated prills still poured freely from the tube after 48 hours and showed no tendency to cake or stick.

Example VII

Caustic prills were treated as in Example VI with a 2.5% solution of benzaldehyde in petroleum ether. After drying for 15 minutes in a desiccator approximately 55 grams of the prills were placed in an open weighing dish about 6 cm. in diameter and 3 cm. in height. The prills formed a layer about 1.5 cm. deep. A similar weighing dish was prepared using untreated prills and both dishes were exposed to an atmosphere of 82° F. and 86% relative humidity for a period of hours. The untreated sample caked on top after one hour's exposure and formed a solid cake after three hours. Even with this dilute aldehyde solution, the treatment was sufficient to protect the other prills from caking. They became slightly damp only after two hours but could still be poured freely after eight hours. The treated prills dissolved readily in water.

Example VIII

Caustic prills were treated as in Example VI with a 10% solution of para-isopropyl benzaldehyde, obtaining similar results.

Example IX

Caustic prills were treated as in Example VI with orthochloro-benzaldehyde, obtaining similar results.

Example X

Pellets of sodium hydroxide were treated with a 10% solution of meta-nitrobenzaldehyde solution in benzene. A coating was formed on these pellets which was pink initially and brown after standing overnight. It protected the pellets from atmospheric moisture for a considerably longer time than untreated pellets exposed to the same atmosphere.

Example XI

A 10% solution of para-dimethylaminobenzaldehyde in benzene was used to treat sodium hydroxide pellets. A white protective coating was formed thereon.

Example XII

A white protective coating was formed on sodium hydroxide pellets similarly treated with a 10% solution of furfural in benzene.

Example XIII

Potassium hydroxide pellets were provided with a white protective coating by treating with a 10% solution of benzaldehyde in petroleum either.

Example XIV

A solution of 10% of furfural in benzene was used to provide potassium hydroxide pellets with a yellow protective coating which retarded moisture pick-up and caking.

The alkalinity of the solid is subject to considerable variation but must be sufficient to react with the aldehyde as previously noted. The desired reaction will result where the solid is composed of about one half or more of caustic alkali.

I claim:

1. A caustic alkali-containing solid consisting essentially of a caustic of a metal of the group consisting of sodium and potassium and covered by a protective coating composed of the corresponding alcohol-alkali metal carboxylate product of the reaction of caustic of the solid surface with an aromatic aldehyde having the aldehyde group attached directly to the aromatic nucleus which undergoes the Cannizzaro reaction and which is selected from the group consisting of benzaldehyde, hydrocarbon substituted benzaldehydes, chlorobenzaldehydes and nitrogen substituted benzaldehydes.

2. A caustic alkali-containing solid consisting essentially of a caustic of a metal of the group consisting of sodium and potassium and covered by a protective coating composed of the benzyl alcohol-alkali metal benzoate product of the reaction of caustic of the solid surface with benzaldehyde.

3. The process for forming a protective coating on a solid surface consisting essentially of a caustic of a metal of the group consisting of sodium and potassium which includes the steps of applying an aromatic aldehyde having the aldehyde group attached directly to the aromatic nucleus which undergoes the Cannizzaro reaction and which is selected from the group consisting of benzaldehyde, hydrocarbon substituted benzaldehydes, chlorobenzaldehydes and nitrogen substituted benzaldehydes, to the surface in sufficient amount to react with the superficial caustic of the surface and removing unreacted material.

4. The process for forming a protective coating on a solid surface consisting essentially of a caustic of a metal of the group consisting of sodium and potassium which includes the steps of applying benzaldehyde to the solid surface in sufficient amount to react with the superficial caustic and removing unreacted material.

5. The process for forming a protective coating on a solid surface consisting essentially of a caustic of a metal of the group consisting of sodium and potassium which includes the steps of applying a 50 per cent solution of benzaldehyde in petroleum ether to the solid surface in sufficient amount to react with superficial caustic and removing unreacted material.

6. The process for forming a protective coating on a solid surface consisting essentially of a caustic of a metal of the group consisting of sodium and potassium which includes the steps of applying a hydrocarbon substituted benzaldehyde to the solid surface in sufficient amount to react with the superficial caustic and removing unreacted material.

7. The process for forming a protective coating on a solid surface consisting essentially of a caustic of a metal of the group consisting of sodium and potassium which includes the steps of applying paraisopropyl benzaldehyde to the solid surface in sufficient amount to react with the superficial caustic and removing unreacted material.

8. The process for forming a protective coating on a solid surface consisting essentially of a caustic of a metal of the group consisting of sodium and potassium which includes the steps of applying ortho chlorobenzaldehyde to the solid surface in sufficient amount to react with the superficial caustic and removing unreacted material.

OWEN F. SPRAGUE.

REFERENCES CITED

The following references are of record in the file of this patent:

UNITED STATES PATENTS

| Number | Name | Date |
|---|---|---|
| 150,509 | Babbitt | May 5, 1874 |
| 1,692,996 | Richardson | Nov. 27, 1928 |

OTHER REFERENCES

Ellis, Chemistry of Synthetic Resins, vol. I, 1934, page 508.

Organic Chemistry, Karrer, 1938, page 145, Nordeman Publishing Company, New York.